United States Patent [19]

Schisler

[11] Patent Number: 4,795,016
[45] Date of Patent: Jan. 3, 1989

[54] FLUID ACTUATOR

[75] Inventor: Robert C. Schisler, Akron, Ohio

[73] Assignee: The Goodyear Tire & Rubber Company, Akron, Ohio

[21] Appl. No.: 23,014

[22] Filed: Mar. 6, 1987

[51] Int. Cl.⁴ .................... F16D 25/04; F01B 19/04
[52] U.S. Cl. ...................... 192/88 A; 192/85 CA; 192/91 A; 92/92; 92/107
[58] Field of Search ............ 192/88 A, 91 A, 85 CA, 192/98; 92/92, 107, 98 D; 188/72.4, 367, 368, 366, 369; 267/64.21, 64.24, 118, 122

[56] References Cited

U.S. PATENT DOCUMENTS

| 2,359,516 | 10/1944 | Frank | 192/88 A |
|---|---|---|---|
| 3,141,523 | 7/1964 | Dickie | 188/1 |
| 3,187,850 | 6/1965 | Russell | 92/92 X |
| 3,627,297 | 12/1971 | Gaydecki | 267/118 |
| 3,627,298 | 12/1971 | Gaydecki | 267/118 |
| 4,051,937 | 10/1977 | Garrett et al. | 192/88 A |
| 4,606,449 | 8/1986 | Lederman | 192/91 A |
| 4,637,505 | 1/1987 | Huber | 192/88 A |

FOREIGN PATENT DOCUMENTS

| 3043861 | 8/1982 | Fed. Rep. of Germany | 192/85 CA |
|---|---|---|---|
| 2435630 | 5/1980 | France | 188/72.4 |

Primary Examiner—Rodney H. Bonck
Assistant Examiner—Richard M. Lorence
Attorney, Agent, or Firm—Marc R. Dion, Sr.

[57] ABSTRACT

This invention is a fluid actuator of the rolling lobe form in which a closed toroidal flexible membrane forms concentric rolling lobes on the inside and outside surfaces of an annular piston which moves axially into the membrane. The fluid actuator can be used in brake and clutch assemblies where the actuator is connected to a high pressure fluid source and serves to activate the brake or clutch assembly, a shaft or axle can pass through the center of the toroid.

9 Claims, 4 Drawing Sheets

FLUID ACTUATOR

BACKGROUND OF THE INVENTION

This invention relates to fluid springs or actuators designed for use with fluids including incompressible and compressible fluids. In particular, the fluid actuator is of the rolling lobe form in which a flexible membrane rolls axially on a piston peripheral surface.

Conventional airsprings utilize a flexible, air-impervious membrane which is fastened in some manner on one end to a piston and on the opposite end to an upper retainer which forms, between the three elements, an internal working cavity for the enclosure of the designed fluid. The attachment of the rubber flexible membrane to the rigid components is a long standing source of leakage and failure of airsprings and air actuators. A flexible member may be used which includes a bead structure at its extreme ends for attachment in suitably formed bead seating areas of the rigid members. In other common configurations, the extreme axial ends of the flexible member are banded, swaged or otherwise compressively engaged against the outer periphery of the rigid membrane to effect an airtight seal at both ends. During service of the conventional beaded and swaged airspring structure, failure or air leakage occurs most commonly at the interface between the rigid member and the flexible membrane.

It is well known from tire technology that a toroidally shaped elastomeric composite structure exhibits unparalleled ability to withstand high internal pressure due to the uniform distribution of force throughout the toroid shape, enabling the bias laid reinforcement fabrics to uniformly distribute the force over the smoothly curving toroidal surface. A tire, however, is an open toroid with the automobile rim or wheel closing the toroid through the use of bead structures in the tire. This invention utilizes a closed toroidally shaped membrane which can withstand high internal pressures. This closed toroid also exhibits the marked advantage that there are no seals and no sealing required for construction and operation of the airspring. In addition, the fluid actuator of the invention provides for a central passageway through the entire axial length of the fluid actuator through which any shaft, shock absorber or other desired member may pass. This configuration is especially useful for such applications as a clutch where the drive shaft may pass through the actuator. Brake applications are also particularly well suited, since a central hub or axle may advantageously pass through the central passageway. A third aspect of the applicant's invention is the formation of dual concentric rolling lobes which result from an annular piston which moves axially into and out of the closed toroidal diaphragm to form an inner rolling lobe and an outer rolling lobe on the inner and outer surfaces respectively of the annular piston. This configuration has the advantage of higher lateral spring rate and stability than standard airsprings. It results in lower axial spring rate than simple bellows airsprings. It can contain a center shaft, axle, shock absorber without any need for airtight sealing.

The fluid actuators of this invention have the advantage that no airtight seals are required on a rolling lobe type spring assembly. Further, the construction of the flexible membrane is simple due to the closed toroidal form of the diaphragm. In addition, there is no obstruction in the center of the airspring or actuator and a structural element of the apparatus in which it is being utilized may pass through the central passage.

BRIEF DESCRIPTION OF THE INVENTION

The foregoing advantages may be realized using a fluid actuator which moves through a predetermined stroke along an axis having a concentric pair of rolling lobes with an open passageway through said actuator coaxial with said axis comprising: a closed toroidal diaphragm of a tough flexible elastomer having an inside diameter and an outside diameter, said diaphragm enclosing a fluid working cavity; an annular piston with inner and outer walls having an average diameter less than the outside diameter and greater than the inside diameter of said diaphragm, said piston being axially movable through said predetermined stroke thereby deforming the diaphragm upon the inner and outer walls to form a concentric pair of rolling lobes from the diaphragm wall rolling over said inner and outer walls: an annular cylinder with a diameter substantially equal to said inside diameter of said closed toroidal diaphragm and positioned within said passageway through said toroidal diaphragm and forming an inner restraint on the radially innermost rolling lobe of said concentric pair of rolling lobes and a fluid port passing through said closed toroidal diaphragm in connection with said fluid working cavity such that fluid may pass into and out of said fluid working cavity.

The actuators of the invention may be used in a variety of brake and clutch applications for power transmission devices comprising a housing, a driving member positioned in said housing and transmitting rotational power into said housing; a driven member positioned adjacent said driving member and transmitting rotational power out of said housing; a means for frictionally engaging said driving member with said driven member capable of transmitting rotational power from said driving member to said driven member and being positioned within said housing; a means for frictionally disengaging said driving member from said driven member positioned within said housing; a fluid actuator positioned in said housing with an open passageway through said actuator coaxial with an axis of actuation and having a closed toroidal diaphragm of a tough flexible elastomer having an inside diameter and an outside diameter, said diaphragm enclosing a fluid working cavity, an annular piston with inner and outer walls having an average diameter less than the outside diameter and greater than the inside diameter of said diaphragm, said piston being axially movable through said predetermined stroke thereby deforming the diaphragm upon the inner and outer walls to form a concentric pair of rolling lobes from the diaphragm wall rolling over said inner and outer walls, an annular cylinder with a diameter substantially equal to said inside diameter of said closed toroidal diaphragm and positioned within said passageway through said toroidal diaphragm and forming an inner restraint on the radially innermost rolling lobe of said concentric pair of rolling lobes, and a fluid port passing through said closed toroidal diaphragm in connection with said fluid working cavity such that a pressurized fluid may pass into and out of said fluid working cavity, said actuator having a first position and a second position, said first position being achieved when a pressurized fluid is injected through said fluid port into said working cavity to expand said rubber diaphragm to an expanded position, thereby actuating said means for frictionally engaging said driving member with said driven member, said second position being achieved when said pressurized fluid is expelled from said working cavity through said fluid port thereby reducing said diaphragm to a dimension less than said expanded size thereby actuating said means for disengaging said driving member from said driven member.

DETAILED DESCRIPTION OF THE INVENTION

Figure 1:
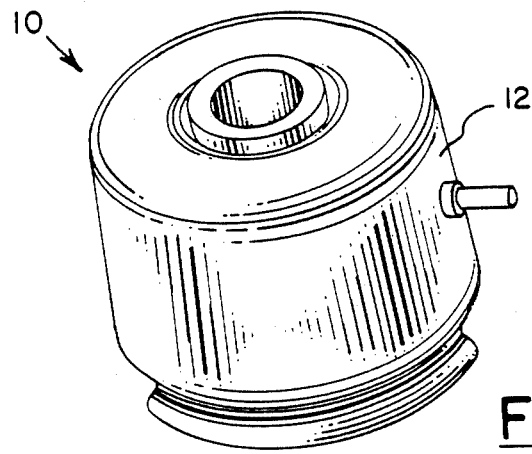
FIG. 1 is a perspective view of the simplest embodiment of the fluid actuator of the invention.
Figure 2:
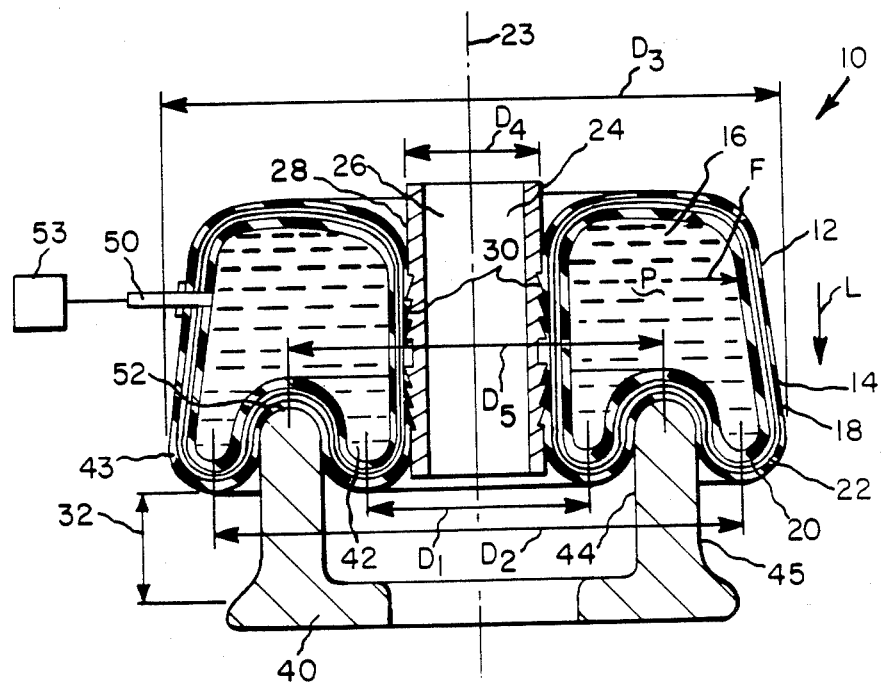
FIG. 2 is a cross sectional view of the actuator of FIG. 1.

FIGS. 1 and 2 show a fluid actuator 10 of the invention. The diaphragm 12 is a closed toroidal shape in which the wall 14 encloses a working cavity 16 in the interior thereof. The diaphragm 12 is manufactured primarily of a matrix of tough flexible resilient elastomer. The elastomer can be any of the conventionally used synthetic or natural rubbers. Also usable in some applications may be thermoplastic elastomers of any of the number of families that are known. The selection of the type of elastomer is a function of a number of parameters including flex life, internal working pressure, chemical resistance, environmental resistance, including oxidation and ozone, thermoservice conditions and many other factors dictated by the particular application in which the actuator 10 or airspring is utilized. Throughout the specification the term actuator is used to characterize the structure 10 of the invention but is understood that this term actuator is synonymous and interchangeable with the term airspring, fluid spring or air bellows which are commonly used names for functionally similar but structurally different devices. The wall 14 of the diaphragm 12 is composed preferably of a plurality of reinforcing fabrics embedded within the elastomeric matrix 18. A pair of fabric layers 20 and 22 are illustrated in FIG. 2. In order to achieve maximum operating pressure range, the fabrics are arranged preferably in a bias angled relationship to the axis 23 of the activator. This use of bias laid reinforcing fabrics such as square woven and cord fabrics is well known in the airspring art and the specific details of such fabric bias angle selection and identify of the particular cord fabrics are known in the art. The fabric layers resist the outward force F exerted by the action of the internal pressure P in the internal working cavity 16 of the diaphragm. The closed toroidal diaphragm has an inside diameter $D_4$ and an outside diameter $D_3$ which represent respectively the inflated diameters of the diaphragm. An annular cylinder 24 is provided with an internal passageway 26, the cylinder 24 has an outside diameter substantially equal to the inside diameter $D_4$ of the diaphragm 12. The cylinder 24 acts to restrain the inside radial expansion of the toroidal diaphragm 12. The outside peripheral surface 28 of the cylinder 24 may optionally be provided with serrations 30 which compressively engage against the inside diameter surface of the diaphragm 12 to prevent axial slippage of the diaphragm relative to the cylinder 24 over the stroke 32 of the actuator 10.

The annular piston 40 has a mean diameter $D_5$ which lies dimensionally between the inside diameter $D_4$ and outside diameter $D_3$ of the diaphragm 12. This relationship of the annular piston and the diaphragm is an essential relationship since the annular piston 40 moves axially into and out of the diaphragm thereby creating an inner rolling lobe 42 and an outer rolling lobe 43 which move upward and downward on the inner surface 44 and outer surface 45 of the annular piston 40. This unique pair of concentric rolling lobes differentiates the action of this actuator 10 from all other types of rolling lobe airsprings. The diameter of the inner lobe is designated as $D_1$ and is measured from the lowest axial extent of the inner lobe 42 during its travel over the stroke 32 of the actuator. Similarly the diameter $D_2$ of the outer lobe 43 is measured at the lowest axial extent of the diaphragm at a particular axial point in the stroke 32. It is clear that the effective area of the airspring can be uniform over the axial stroke 32 of the actuator if the inner and outer walls 44 and 45 of the annular piston 40 lie parallel to the outer peripheral surface 28 of the cylinder 24. In this special case the annular piston is an annular cylinder over its length and the actuator would have uniform force throughout its stroke.

Figure 6:
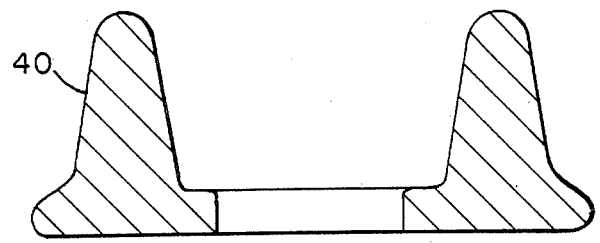
FIG. 6 is a cross-sectional view of a forward tapered annular piston.
Figure 7:
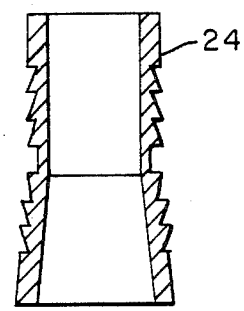
FIG. 7 is a cross-sectional view of an annular cylinder which is tapered into a cone shape.

It is clear that the relationship of the inner 44 and outer walls 45 of the annular piston 40 may be at an angle relative to the cylinder 24, thereby creating a variable effective area over the stroke of the actuator. This changes the load carrying capability and the spring rate of the actuator over its stroke. These surfaces 44 and 45 may be back tapered or forward tapered (as shown in FIG. 6) relative of cylinder 24. It is also noted that variable area may be achieved through tapering of the cylinder into a annular cone shape (as shown in FIG. 7) to effect a variable effective area over the stroke as well. The radially outer peripheral surface would form an acute angle with said axis depending upon the particular desired characteristics of the application, these surfaces can be tailored specifically to create a given load deflection curve. The effective area of the diaphragm is that of a flat annular ring of inner mean diameter $D_1$ and an outer mean diameter $D_2$. The effective Load L due to the internal pressure P in the internal working cavity 16 is expressed by the equation $L = [\pi P[(D_2 D_2) - (D_1 D_1)]]/4$. When a constant load deflection characteristic is desired, then $D_1$ and $D_2$ would remain a constant over the axial stroke 32 of the actuator. Where a variable spring rate or variable load deflection characteristic is required over the stroke, then $D_1$ and $D_2$ would be made to vary by tapering the piston 40 and/or the cylinder 24 in the appropriate manner. Such variable spring rate fluid springs and actuators are known and the detail of such configurations will not be set forth in this specification.

Figure 4:
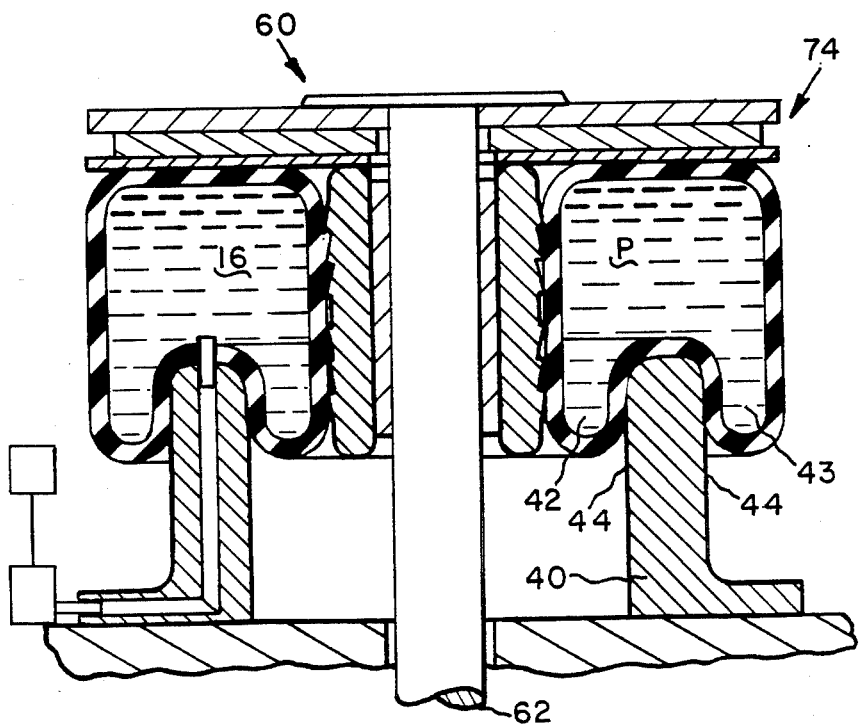
FIG. 4 is the assembly of FIG. 3 shown in an engaged position.

A fluid conduit 50 is provided which connects with the internal working cavity 16 to allow for the pressurization and depressurization of the diaphragm through the introduction and withdrawal of a suitable fluid. The fluid conduit 50 may take the form of any suitable stem or valve. In the simplest form an inner tube type fitting or valve such as those manufactured by Schrader Bellows Company, division of Scovill Corporation, may be utilized, although other more complicated two-way valve devices may be better suited for special actuator applications. If the device is utilized as an airspring, then a simple fitting such as a Schrader valve may be utilized to introduce an initial pressure P which is maintained over the service life of the device. Although it is not illustrated, it is apparent that the fluid conduit 50 may be provided through the top most surface 52 of the annular piston 40 as illustrated in FIG. 4. Since the portion of the diaphragm 12 outer surface which contacts the piston at the surface area 52 is essentially stationary over the stroke 32 of the actuator, the fitting may be positioned through the wall 14 of the diaphragm 12 at that point. A suitable fluid passage through the piston 40 would be provided in this particular embodiment. The fluid conduit 50 can be connected to a source of pressurized fluid 53 capable of varying the internal pressure P of the working cavity 16 to provide variable load-deflection curves and spring rates for various service conditions. The source of pressurized fluid may in turn be connected to a sensor mechanism or control device for continuously varying the internal pressure.

Figure 3:
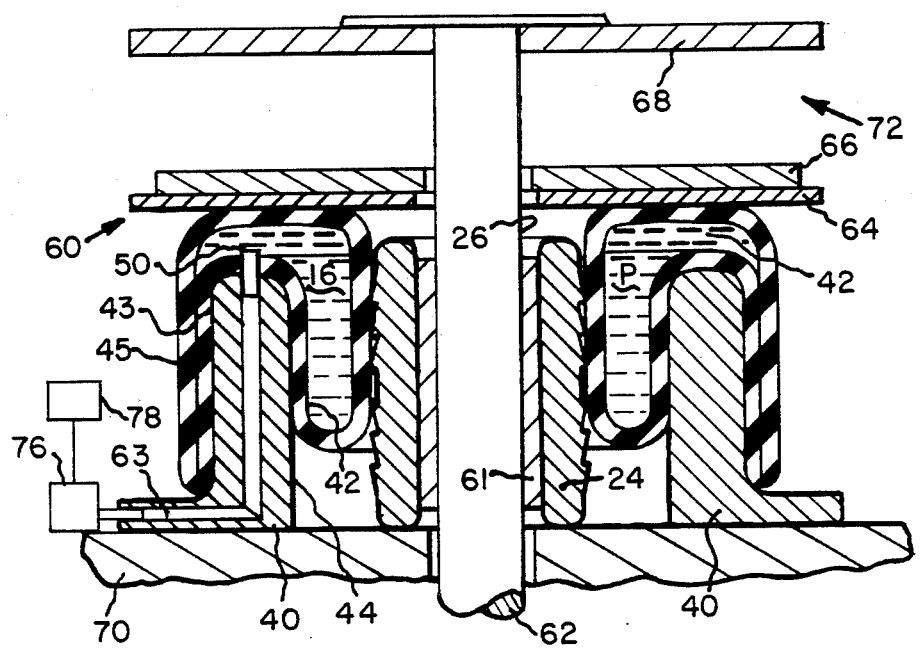
FIG. 3 is a simplified schematic of a clutch or brake assembly utilizing an actuator shown in a disengaged position similar to FIGS. 1 and 2.

An actuator similar in all respects to actuator 10 of FIGS. 1 and 2 is depicted in FIGS. 3 and 4 in the environment of a brake assembly 60. The same reference characters are used in FIG. 3 to describe elements of the actuator 10 which are identical to those of FIGS. 1 and 2. The assembly 60 includes a center shaft 62 running through the passageway 26 of activator 10 with the shaft extending through the central portion of the concentric cylinder 24. Cylinder 24 may be advantageously mounted on bearings 61 to allow it to move axially along the center shaft 62. The annular piston 40 abuts the diaphragm 12 in an annular fashion to create the inner and outer lobes 42 and 43 on the inner and outer surfaces 44 and 45 respectively. A fluid inlet 63 provides pressurized incompressible hydraulic fluid through the fluid conduit 50 extending through the wall 14 of the diaphragm 12. A pusher plate assembly 64 surrounds the center shaft 62 and is moved axially during the activation motion of the activator 10. It may be slidably attached to a frame 70 which prevents rotation of the pusher plate much like a caliper arrangement on a conventional automotive disk brake. The pusher plate 64 can be of any suitable configuration and is simply an axially movable element of the braking device which engages the friction element 66 against the rotor assembly 68. When the frictional element engages the rotor, the inertial energy of the rotor and shaft is transferred to and absorbed by the frame 70 through the pusher plate 64. The annular piston 40 is fixedly attached to the frame 70 of the device on which the brake assembly 60 is being utilized. It is understood that the shaft and/or rotor are mounted on suitable bearing devices in the frame 70 which are not shown.

The diaphragm 12 is shown in FIG. 3 in its compressed condition where pressure P is at a predetermined low point. In this position the plate 64 is axially retracted to a first axial position 72. When hydraulic fluid is introduced into the working cavity 16 of the diaphragm 12 through the fluid inlet 63, the diaphragm expands pushing the plate 64 axially to a second position 74 shown in FIG. 4. The fully inflated and expanded shape of the diaphragm 12 and the positioning of the various elements of the brake assembly 60 are also shown in FIG. 4 to designate their position in the fully expanded state of activation.

Fluid inlet 63 connects to a source of pressurized fluid 76 which is in turn connected to a means for controlling the flow of fluid. It is understood that that control means may be a brake or clutch pedal 78 which is connected in turn to a master hydraulic cylinder which would correspond to the source of pressurized fluid 76.

Similar configuration to that shown in FIG. 3 may be utilized for any of a number of activation applications such as brake and clutch assemblies with the understanding that in certain assemblies the piston may move relative to a fixed upper retainer plate in a converse fashion to what is shown in FIG. 3. A clutch assembly provided with return springs is a device in which the fully inflated diaphragm serves the function of overcoming the biasing force of the return springs.

Figure 5:
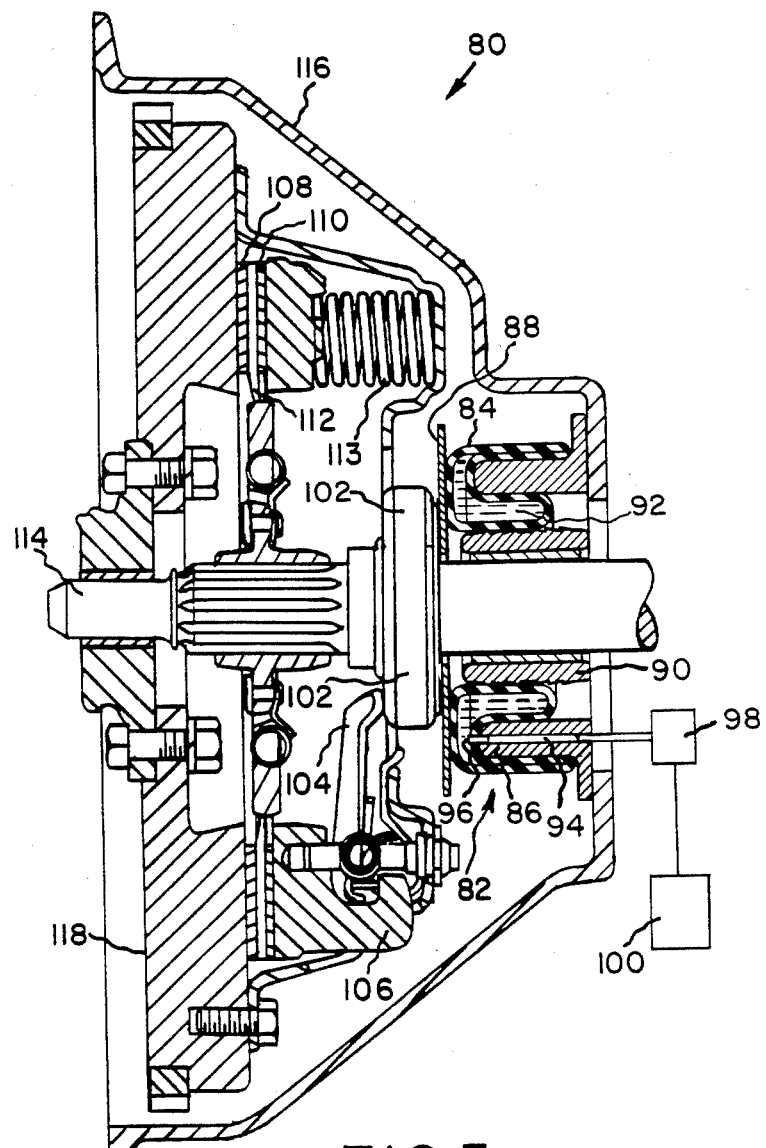
FIG. 5 is a clutch assembly, in cross section, utilizing an actuator of this invention.

A simplified schematic drawing of a clutch is set forth in FIG. 5. The clutch 80 is actuated by an actuator 82 which is structurally similar to the actuator shown in FIGS. 1 and 2. All elements of the clutch lie within the bell housing 116 except the engine which is not shown but is connected to the driving element which is the flywheel 118. The actuator 82 includes a toroidal diaphragm 84 with an annular piston 86 and a pusher plate 88 which is axially opposed to the annular piston 86. An internal retaining cylinder 90 restrains the inward radial expansion of the diaphragm 84. The working cavity 92 is in communication with a fluid passageway 94 which connects through the diaphragm 84 at a port 96. Pressurized fluid enters the working cavity 92 through the fluid passage 94 from a suitable source such as a hydraulic master cylinder 98 which is in turn connected to an activation means such as a clutch pedal 100. When the clutch mechanism is to be activated the master cylinder 98 is actuated by the clutch pedal 100 and forces hydraulic fluid into the working cavity 92 through the port 96 and moves the pusher plate 88 against the throw-out bearing 102 which activates the release lever 104 which axially moves the pressure plate 106 away from contact with the friction pads 108 and 110 thereby allowing the flywheel 118 to freely rotate without rotation of the shaft 114 or the driven plate 112. All of this mechanical action is conventional within a standard automobile type clutch. When the clutch mechanism is to be reversed to engagement, the hydraulic pressure in the master cylinder 98 is released allowing the exit of portions of the hydraulic fluid from the working cavity 92 of the actuator 82. The hydraulic fluid is forced out of the diaphragm 84 by the action of the pressure spring 113 which returns the pressure plate and throw-out bearing to their original engaged position thereby axially moving the pusher plate 88 toward the piston 86 which is fixedly attached to the housing 116. The flywheel 118 transfers smooth rotational power from the source of rotational power such as an engine. It serves as the driving element in the power transmission device shown. Most elements are mounted for rotation within the housing 116 using conventional bearing methods in the conventional manner. Many other configurations of clutch mechanisms can be envisioned. The actuator 82 of this invention can be utilized in any such clutch mechanisms where relatively small axial displacements are necessary. The advantages of no seals and no potential hydraulic leakage are carried through in this clutch embodiment.

Many other analogous systems can be envisioned. While certain representative embodiments and details have been shown for the purpose of illustrating the invention, it will be apparent to those skilled in this art that various changes and modifications may be made therein without departing from the scope of the invention.

What is claimed is:

1. A fluid actuator which moves through a predetermined stroke along an axis having a concentric pair of rolling lobes with an open passageway through said actuator coaxial with said axis comprising:
   (a) a closed toroidal diaphragm of a tough flexible elastomer having an inside diameter and an outside diameter, said outside diameter being restrained only by reinforcing fabric embedded in said elastomer, said reinforcing fabric comprising at least two layers of bias-angled plies of cord fabric, said diaphragm enclosing a fluid working cavity;
   (b) an annular piston with inner and outer walls having an average diameter less than the outside diameter and greater than the inside diameter of said diaphragm, said piston and diaphragm being axially movable relative to each other through said predetermined stroke, the diaphragm being deformed upon the inner and outer walls of said piston to form a concentric pair of rolling lobes;
   (c) an annular cylinder with an outside diameter substantially equal to said inside diameter of said closed toroidal diaphragm and positioned within said passageway through said toroidal diaphragm and forming an inner restraint on the radially innermost rolling lobe of said concentric pair of rolling lobes; and
   (d) a fluid port passing through said closed toroidal diaphragm in connection with said fluid working cavity such that fluid may pass into and out of said fluid working cavity.

2. A fluid actuator according to claim 1 wherein said annular cylinder further comprises a plurality of circumferential serrations on a radially outwardly facing periphery of said cylinder which contact said diaphragm over the predetermined stroke of said actuator to prevent substantial axial slippage of said diaphragm on said radially outwardly facing periphery.

3. A fluid actuator according to claim 1 wherein said annular piston has a taper on at least one of said inner and outer walls to create a variable spring rate over the predetermined stroke of said actuator.

4. A fluid actuator according to claim 1 wherein said fluid port is a valve sealingly positioned through said closed toroidal diaphragm.

5. A fluid actuator according to claim 1 further comprising an upper restraining member positioned substantially perpendicular to said axis and axially movable relative to said annular piston.

6. A fluid actuator according to claim 1 further comprising a central shaft member passing through said passageway.

7. A fluid actuator according to claim 1 wherein said annular cylinder has a radially outer peripheral surface forming an acute angle to said axis.

8. A power transmission device comprising:
   (a) a housing;
   (b) a driving member positioned in said housing and transmitting rotational power into said housing;
   (c) a driven member positioned adjacent said driving member and transmitting rotational power out of said housing;
   (d) a means for frictionally engaging and disengaging said driving member and said driven member;
   (e) a fluid actuator positioned in said housing with an open passageway through said actuator coaxial with an axis of actuation and having
   a closed toroidal diaphragm of a tough flexible elastomer having an inside diameter and an outside diameter, said outside diameter being restrained only by reinforcing fabric embedded in said elastomer, said reinforcing fabric comprising at least two layers of bias-angled plies of cord fabric, said diaphragm enclosing a fluid working cavity,
   an annular piston with inner and outer walls having an average diameter less than the outside diameter and greater than the inside diameter of said diaphragm, said piston being axially movable relative to said diaphragm through a predetermined stroke thereby deforming the diaphragm upon the inner and outer walls to form a concentric pair of rolling lobes from the diaphragm rolling over said inner and outer walls,
   an annular cylinder with an outside diameter substantially equal to said inside diameter of said closed toroidal diaphragm and positioned within said passageway through said toroidal diaphragm and forming an inner restraint on the radially innermost rolling lobe of said concentric pair of rolling lobes, and
   a fluid port passing through said closed toroidal diaphragm in connection with said fluid working cavity such that a pressurized fluid may pass into and out of said fluid working cavity,
   said actuator having a first position and a second position, said first position being achieved when a pressurized fluid is injected through said fluid port into said working cavity to expand said rubber diaphragm to an expanded position, thereby disengaging said driving member from said driven member, said second position being achieved when said pressurized fluid is expelled from said work cavity through said fluid port thereby reducing said diaphragm to a dimension less than said expanded size thereby engaging said driving member and said driven member.

9. A power transmission device according to claim 8 used as a clutch wherein said driving member is a rotating flywheel positioned within said housing, said driven member is a shaft extending through said housing and rotationally mounted therein, said shaft having a driven plate rigidly connected thereto said means for frictionally engaging and disengaging said driving member and said driven member comprises a throw-out bearing and pressure plate combination with the throw-out bearing being rotationally mounted on said shaft so as to be axially movable relative to said shaft to a position in which the pressure plate, which is connected for rotation with the fly wheel disengages from the drain plate, said means for frictionally engaging and disengaging said driving member and said driven member further includes a spring biasing member connected to said pressure plate to bias said pressure plate to an engaged position against said driven plate, said flywheel being positioned adjacent to, but spaced part from said driven plate with an annular space separating said driven plate and said flywheel when said throw-out bearing and pressure plate combination is in said disengaged position, said actuator being positioned to abut said throw-out bearing and axially move said bearing to disengage said pressure plate from said driven plate when said pressurized fluid fills said working cavity, said spring biasing member acting to deflate said diaphragm and move said actuator to a second position where said pressurized fluid is removed from said working cavity.

* * * * *